United States Patent Office 3,420,098
Patented Jan. 7, 1969

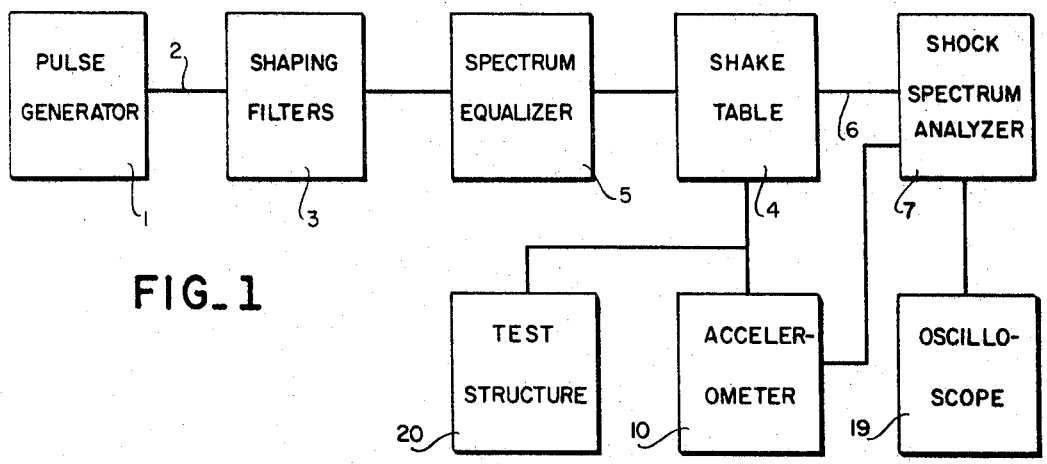
FIG_1
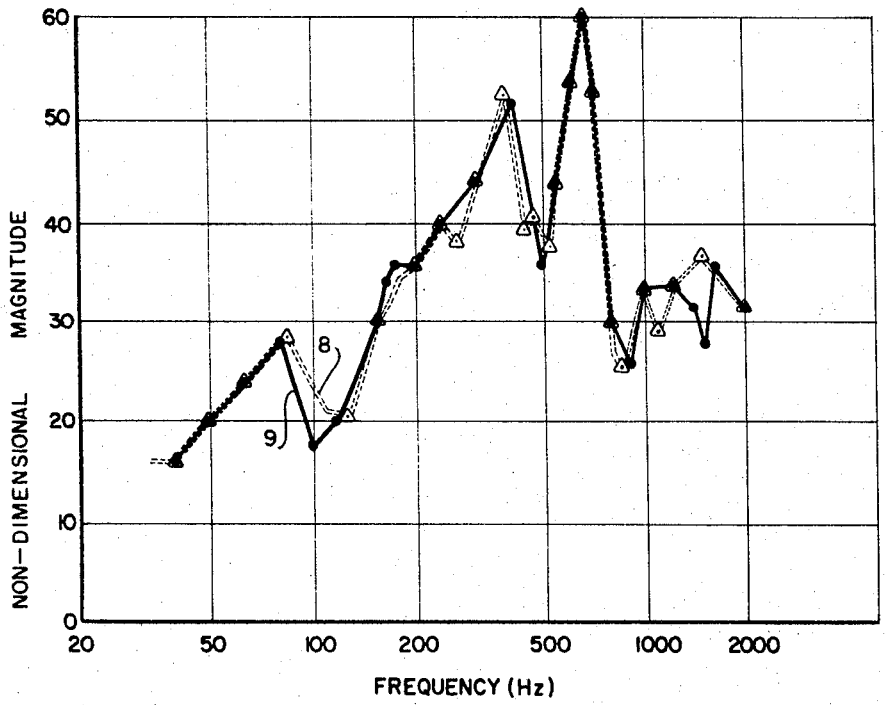
FIG_2
INVENTORS
GILES W. PAINTER
HUGH J. PARRY
By George C. Sullivan
Agent FIG_3
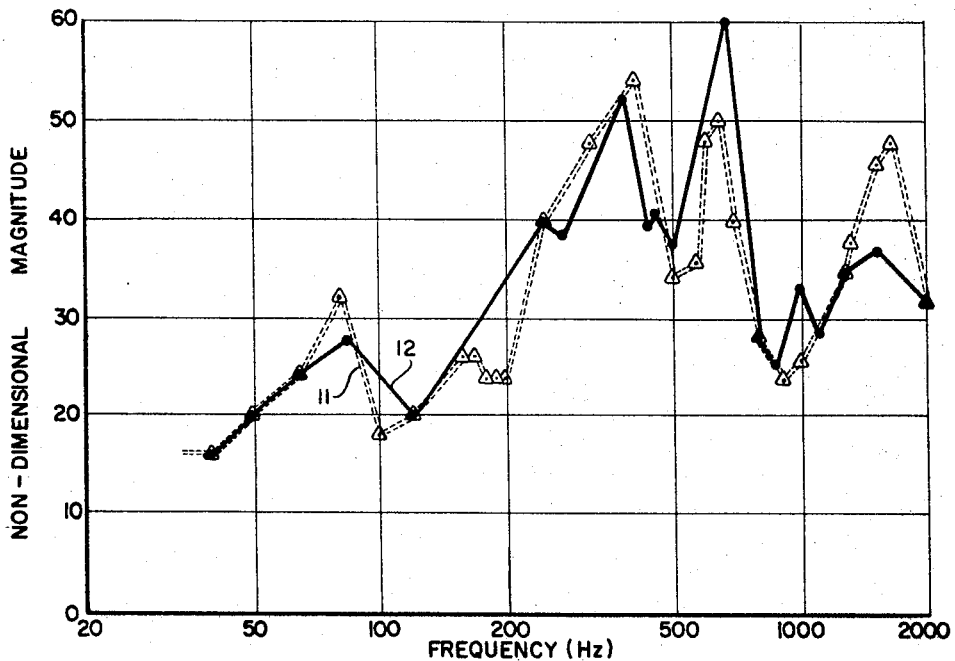
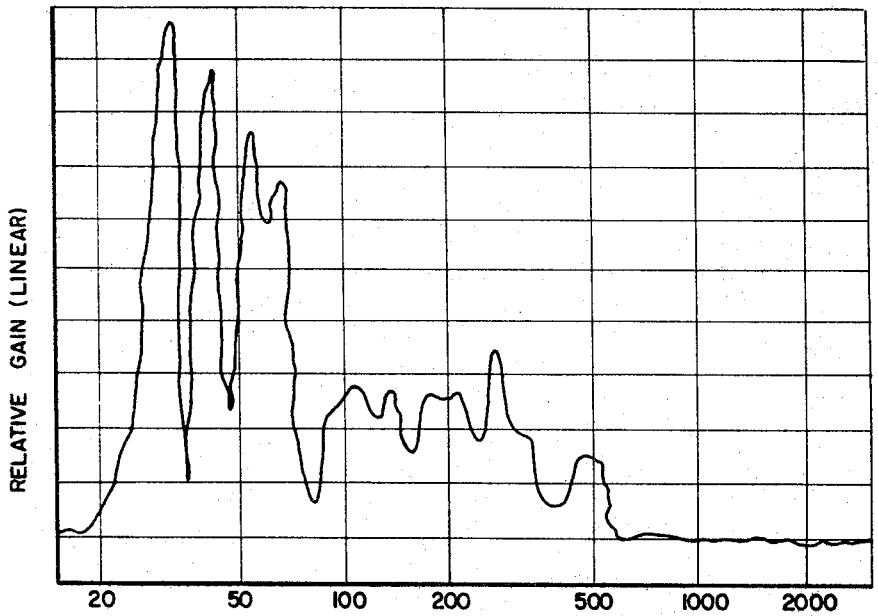
FIG_6

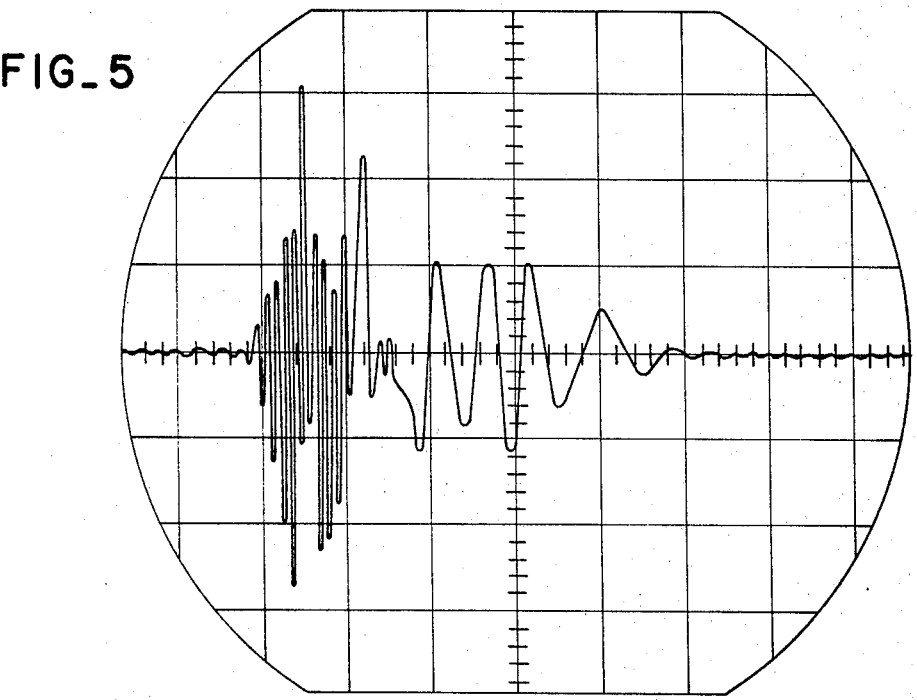
FIG_5
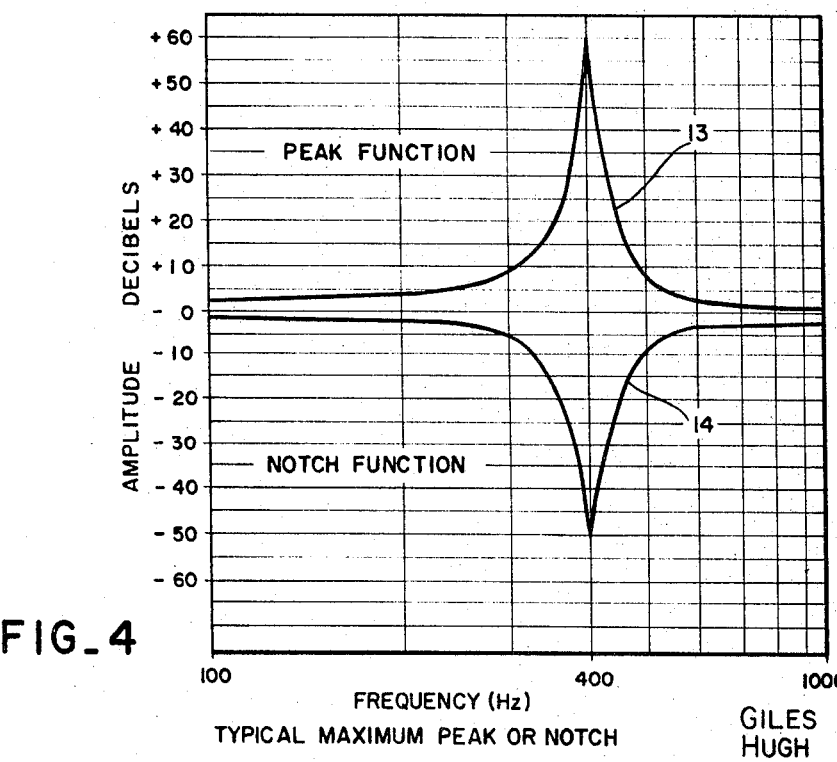
FIG_4
TYPICAL MAXIMUM PEAK OR NOTCH

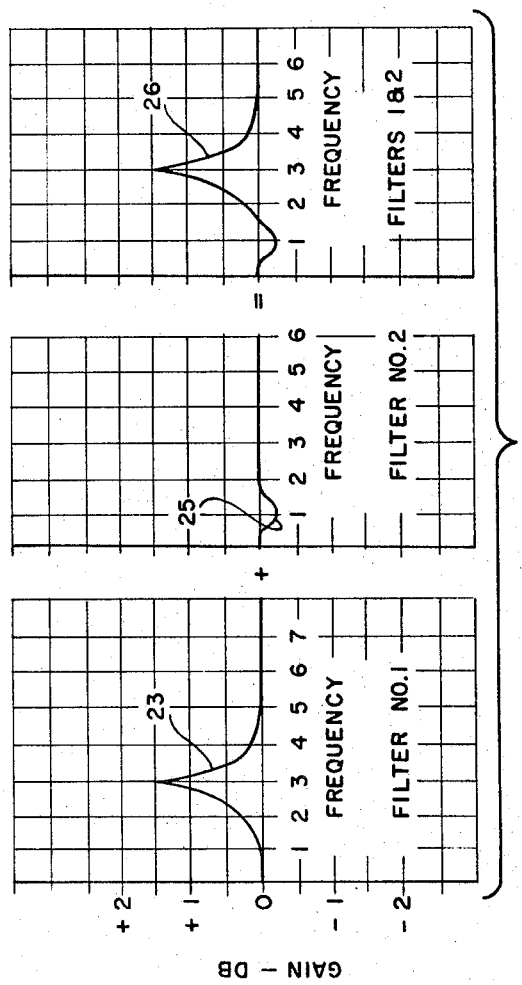
FIG._7
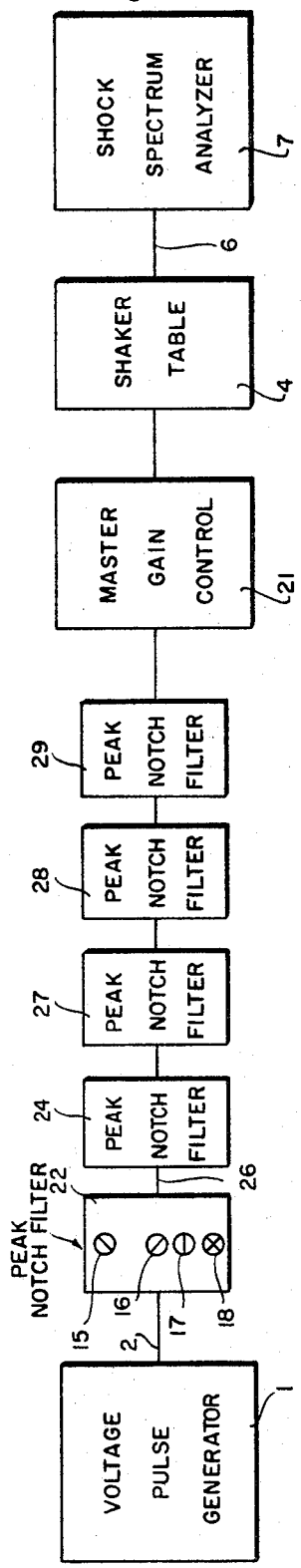
FIG._8
INVENTORS
GILES W. PAINTER
HUGH J. PARRY
By *George C. Sullivan*
Agent

3,420,098
TRANSIENT SYNTHESIZING SYSTEM
Giles W. Painter, Granada Hills, and Hugh J. Parry, Van Nuys, Calif., assignors to Lockheed Aircraft Corporation, Burbank, Calif.
Continuation-in-part of application Ser. No. 382,493, July 14, 1964. This application Aug. 22, 1967, Ser. No. 662,425
The portion of the term of the patent subsequent to Oct. 10, 1984 has been disclaimed and dedicated to the Public
U.S. Cl. 73—71.6  7 Claims
Int. Cl. G01n 29/00

ABSTRACT OF THE DISCLOSURE

The apparatus of the invention produces an electrical oscillatory transient having a given spectrum envelope. This transient is applied to an electrodynamic shake table to produce an acceleration transient suitable for the shock testing of structures. Synthesis of the shock transient is achieved by the application of a short driving pulse to an appropriate number of series-connected peak-notch filters. The weighted, composite output of the filters corresponds to the desired shock-spectrum envelope.

Related application

This is a continuation-in-part of patent application, Ser. No. 382,493, filed July 14, 1964.

Brief summary of the invention

This invention relates to pulse waveform generation for dynamic testing, and more particularly to a novel method for producing oscillatory motion transients with selectable shock spectra which may be produced on an electrodynamic shake table.

Shock testing of structures is usually acomplished by drop testing or by impacting the equipment with a moving mass. More recently attempts have been made to use electrodynamic shake tables for applying the desired test transient. These efforts have accompanied the production of large shake tables and electronic amplifiers, and have arisen not only from the desire to allow greater flexibility in controlling the magnitude and duration of the test pulse, but also from a consideration of potential cost reduction that can be realized if the same apparatus could be used for both shock and vibration testing. For the most part, the use of electrodynamic shake tables has been confined to the production of approximate classical time functions, such as the half-sine and saw-tooth acceleration pulses. These test pulses generally bear little resemblance to the complex transients actually experienced in the operating environment encountered in missiles and space vehicles during ignition, stage separation, and landing impact. The amplitude and duration of the test pulses are generally so chosen as to produce a shock spectrum that is, at all frequencies, in excess of that associated with transients measured in the actual operating environment. Since the pulse shape fixes the shape of the response spectrum, the test engineer must accept spectral magnitudes at some frequencies that are considerably in excess of operational levels. Furthermore, it is usually not possible to ameliorate the distortion introduced by the dynamic response of the test fixture.

A commonly employed method for describing a shock transient involves the determination of the response spectrum produced by the transient. The response spectrum does not define the shock transient, but instead defines the effect of the shock upon dynamic response of hypothetical single-degree-of-freedom resonators having various natural frequencies. There are several types of response spectra which are employed. First of all, the hypothetical resonators may be damped or undamped, thereby yielding damped or undamped response spectra. Secondly, the total response spectrum, whether damped or undamped, can be divided into a primary spectrum and a residual spectrum. The primary spectrum is defined as the peak value of the response that occurs during the time interval that the shock transient is in effect; the residual spectrum is the peak response after the shock transient has terminated. The peak response that occurs, irrespective of when it occurs, defines the total spectrum. In practice, the total spectrum is generally employed, and in general, some level of damping is assigned to the hypothetical resonators.

A response spectrum is a measure of the shock transient only in a very restricted sense. There does exist a one-to-one correspondence between the absolute value of the Fourier spectrum of the transient in the undamped residual spectrum, but no such relation exists for total spectrum. Even for the case of a defined undamped residual spectrum, it is not possible to define the shock transient, or its complex Fourier spectrum) since no phase information is available.

Theretofore, little attention has been given to the problem of determining the transient time functions that will yield given response spectra-versus-frequency patterns. Nevertheless, there has existed a real need to devise laboratory environmental shock tests whose response spectra would follow some desired variation over the frequency range of interest. As mentioned hereinabove, prior to this invention this need has been sidestepped by employing shock test machines to produce a time function that approximates a classical pulse shape (such as a half-sine, triangular, or square pulse). The response spectra associated with these "classical" pulses are well known and by making the pulse amplitude great enough, a sufficiently severe test can be achieved.

There are a number of disadvantages associated with using classical pulse tests and among them is the limited control over shaping the spectrum contour. As a result, excessive response levels must usually exist at certain frequencies in order to assure sufficiently high levels at other frequencies.

Electromagnetic vibration shake tables have been sufficiently refined, that some interest has been directed to their use for shock testing. For convenience and brevity throughout the following description the term "shaker" will be used to indicate an electrodynamic shake table. Originally, primary interest centered on using shakers to obtain classical pulses, but more recently the emphasis has been on producing rather complicated oscillatory shock transients that are similar to those measured in flight vehicles. To this end, it is highly desirable to devise a method for defining oscillatory transients that will produce a desired spectral pattern. In particular, assuming that a shaker can produce an input transient with limited distortion, it is desirable to not only define a suitable shock transient, but also to produce it in the form of electrical input signals to the shaker. The present invention provides a method for producing electrical transients having a response spectrum which closely approximates a desired pattern over the frequency range of interest. The equipment utilized to accomplish the method of the present invention is entirely compatible for use with commercially available random vibration test equipment. Secondly, it allows both shock and vibration tests to be conducted with a single test machine or shaker.

It is, therefore, the principal object of the present invention to provide novel and improved methods and apparatus for pulse waveform generation, useful in dynamic testing of structures.

Another object of the invention is to provide novel and improved techniques for the generation of motion-time transients.

Still another object of the invention is to provide novel and improved shock testing methods and apparatus.

Yet another object of the invention is to provide novel and improved shock testing means and methods which can be conducted with the same test machine employed in vibration testing.

It is still another object of the invention to provide novel means and methods for the generation of a transient waveform which can be selectively shaped to provide a close approximation of a desired shock spectrum.

It is yet another object of the invention to provide novel and improved dynamic testing means and methods which may be used to substantially eliminate non-representative oscillations peculiar to test fixture designs, if desired.

It is still another object of the invention to provide a novel and improved shock test technique which eliminates the unrealistic load imposed upon components having a low natural frequency, by the high velocity change associated with shock testing techniques used heretofore.

A general object of this invention is to provide novel and improved shock testing methods and apparatus which overcomes disadvantages of previous means and methods heretofore intended to accomplish generally similar purposes.

The invention will be understood more completely from the following detailed description taken in conjunction with the drawings in which:

FIGURE 1 is a block diagram of apparatus suitable for use in carrying out the novel method of the invention.

FIGURE 2 graphically illustrates a simulated positive shock spectrum and a recorded transient envelope in which a non-dimensional magnitude is plotted along the axis of the ordinate and frequency in hertz is plotted along the axis of the abscissa.

FIGURE 3 is a graphic representation of a simulated negative shock spectrum as compared with a recorded transient envelope in which a non-dimensional magnitude is plotted along the axis of the ordinate and frequency in hertz is plotted along the axis of the abscissa.

FIGURE 4 is a graphic representation of two typical frequency response curves that can be obtained with a peak-notch filter of the type employed in the apparatus of the invention.

FIGURE 5 is an oscillogram of the voltage transients associated with the spectra given in FIGURE 2.

FIGURE 6 is a graphic representation of the absolute Fourier spectrum of the transient shown in FIGURE 5, in which relative linear gain is plotted along the axis of the ordinate and frequency in hertz is plotted along the axis of the abscissa.

FIGURE 7 graphically illustrates the combination of two peak-notch filters in series to provide a given transfer function.

FIGURE 8 is a block diagram of apparatus employing a plurality of individual peak-notch filter outputs to provide the synthesized shock transient spectra.

The method of the invention is based upon the fixed relation that exists between the undamped residual response spectrum and the absolute value of the complex Fourier transform of the transient producing the residual spectrum. It can be shown that if the undamped residual acceleration spectrum at a frequency $\omega_n$, is given by $A_n$, then:

$$|F(\omega_n)| = \frac{A_n}{\omega_n} \quad (1)$$

where $$|F(\omega_n)|$$

is the absolute Fourier spectrum of shock transient.

Equation 1 establishes the value of the absolute Fourier transform required to produce $A_n$ at $\omega_n$.

It is of importance to note that Equation 1 shows that the variation of the residual spectrum with frequency is entirely independent of phase angle. Thus, it is possible to calculate a time function $F(t)$ that would yield $|F(\omega_n)|$ by assuming an arbitrary phase angle variation with frequency. The present invention involves, for a given $|F(\omega_n)|$ or $A_n$, the production of one such time function as an electrical voltage transient. A practical application of the method of the invention consists of using a set of controllable gain filters for shaping a transfer function whose absolute value corresponds approximately to a desired $|F(\omega_n)|$. The voltage transient is obtained from the filter set output when an unidirectional voltage pulse of very short duration (of the order of $10^{-5}$ seconds), is applied to the inputs of the filters comprising the set. This implementation of the method of the invention is based on the fact that a response signal whose Fourier transform corresponds to the transfer function of a given dynamic system can be created by exciting the system with a unit impulse. As will also appear from the ensuing description, the method can be used for producing time functions that will yield a desired variation in total shock or response spectrum.

Although it is possible by analytical methods to derive any number of time functions that would satisfy a given absolute Fourier spectrum, the present invention meets the practical necessity of providing a method which permits the test engineer to rely upon instrumentation alone for deriving and producing a required acceleration transient. The method of the invention not only provides for the generation of time transients whose absolute Fourier transform approximates a desired value, but is also suited to the generation of complex transients that will yield a close approximation of desired shock spectra patterns.

There is shown in FIGURE 1 a block diagram of the apparatus used in carrying out the shock spectrum synthesis method of the invention. A pulse generator 1 suitable for producing short square-wave pulses is used as the generating source. The filter drive pulse produced by generator 1 is sufficiently short (of the order of 100 microseconds) to have an associated Fourier transform which is virtually flat from zero to above 2000 hertz (Hz.). The voltage pulse is applied via line 2 to a network of shaping filters 3. Shaping filters 3 comprise a plurality of series-connected peak-notch filters, the characteristics of which will be described in the paragraph which follows. The combined outputs of filters 3 are weighted via spectrum equalizer 5, amplified, and supplied as a complex transient waveform to shake table 4.

Two typical frequency-versus-amplitude response curves that can be obtained with a peak-notch filter are shown in FIGURE 4. These curves are seen to indicate a gain of unity over much of the frequency range, but to exhibit a peak (upper curve 13) or notch (lower curve 14) at approximately 400 Hz. A filter having these characteristics, and which is suitable for use in the apparatus of the present invention, fully described in U.S. Patent No. 2,888,526 entitled "Peak and Notch Filters Including Active Elements." A peak-notch filter of the type employed in the present invention has the following four selectively variable parameters:

(1) Either a peaking or a notching characteristic in the frequency versus amplitude response curve.
(2) The sharpness (or "Q") of the peak/notch is adjustable over a range of $Q=0$ to $Q=1000$.
(3) The center frequency of the peak/notch is adjustable over a wide frequency range (typically 30 to 5000 Hz.).

The shake table motion transient is applied to the test structure 20 and is sensed by an accelerometer 10 whose output signal is fed via line 6 to a shock spectrum analyzer 7. The weighting of the outputs from filters 3 is adjusted to give the desired shock spectrum as indicated by shock spectrum analyzer 7. The analyzer output may be observed by means of an oscilloscope 19. The analyzer 7 may be of any suitable construction and may, for example, be of the type shown and disclosed in co-pending application, Ser. No. 403,818, filed Oct. 14, 1964, of common assignee herewith. It is to be understood that inasmuch as the shock spectrum analyzer does not constitute part of the instant invention, only so much as the structural details and operational features thereof considered to be essential for complete understanding of this invention are described hereinafter.

The analyzer 7 employs a series of networks and operational amplifiers and can be considered to be a special-purpose analog computer. The Q of the analyzer is continually adjustable over a range of 5 to 50. Once selected, Q remains constant as the resonance of the "sampling" frequency is adjusted. This frequency is continuously variable in an interval from 20 to 2000 Hz.

In tests that employ classical unidirectional pulses, the severity of the test specification derived is greatly dependent upon the Q value that is assumed for the hypothetical resonators in deriving shock spectra from flight transients. An advantage of the present invention is that the choice of Q becomes less critical when oscillatory test transients are synthesized to yield damped spectra based upon the same Q value used in determining the shock spectra of transients recorded in flight.

The transient synthesis procedure is as follows: The shaker system is first equalized by the conventional techniques used in random vibration testing. The network of shaping filters 3 is then introduced into the system. The filter drive pulse on line 2 is applied to the series-connected shaping filters 3, at periodic intervals. The output transients from the filters 3 are fed to an amplifier whose output is in turn passed to the shock spectrum equalizer 5. Separate gain controls are provided for each of the shaping filters, as will be more readily understood from the discussion of FIGURE 8 in a subsequent part of this specification. The output of the shock spectrum analyzer 7 is affected by all frequencies that fall below the sampling frequency, but very little by higher frequencies. For this reason, transient synthesis involves a "building block" process.

When synthesizing shock transients having specified shock spectra characteristics, the following procedure is used:

The center frequencies of the fiters are set at suitably spaced intervals and the gain controls are set at unity. The "Q's" of the filters are set to desired values. The actual value chosen will generally depend upon the center frequency spacing.

In the exemplary case which follows, the shock spectra envelopes are generally rather smooth and contain no sharp peaks or notches. The production of peaks with jagged spectra would require shaping filters of narrower bandwidth. Sharp deviations in shock spectra which might arise from narrow peaks and notches tend to become increasingly subdued as the Q of the spectrum analyzer is decreased. In a majority of cases, the Q of the analyzer may be set at 10, a value that previously has been employed in deriving the shock spectra associated with transients measured in flight.

There is shown in FIGURES 2 and 3 a synthesized voltage transient and the actual spectra based on transients recorded during flight test of an aerospace vehicle. The transient envelope as recorded in an actual flight is indicated by the dotted line 8 connecting the points indicated by the symbol ∆. The simulated spectrum (positive) is indicated by the solid line 9 connecting the points indicated by the symbol ●. The agreement between the desired 8 and the produced 9 spectra is seen to be very close. The shock spectrum shown in FIGURE 3 is similar to the spectrum of FIGURE 2 except that it is negative rather than positive. The flight transient envelope is indicated by the dotted line 11 and the simulated spectrum (negative) is indicated by the solid line 12. As can be seen by comparing the envelopes of FIGURES 2 and 3, the positive and negative spectra are virtually identical, thus eliminating the need for changing equipment orientation.

There is graphically shown in FIGURE 7 the derivation of a desired spectrum envelope by combining to peak/notch filters in series to provide a given transfer function. The first filter (e.g., filter 22 of FIGURE 8) is set to perform the function of inserting a peak in the frequency response at a selected frequency. This response is indicated by curve 23 having its peak at 3 kilohertz. The second filter (e.g., filter 24 in FIGURE 8) is set to function as a notch filter. The center frequency of the notch is shown by curve 25 to be at 1 kilohertz. The gain (or insertion loss) is selectable for each filter. The combined output response is shown by curve 26. In general the notching capability of the peak/notch filters will not be employed. However, in some cases it may be necessary to employ notching in reducing resonant response in the shake table or in the attached test structures.

The oscillogram of FIGURE 5 represents the voltage transients associated with the spectra given in FIGURE 2. The absolute Fourier spectrum for the same transient is graphically shown in FIGURE 6. As the effective bandwidth of the synthesized shock transient increases, the ratio of the peak acceleration of the shock spectrum to the peak acceleration (magnification ratio) of the transient decreases. The transients that produce the shock spectra shown in FIGURE 2 have rather broad band Fourier spectra and the associated magnification ratio, based on a Q of 10, is approximately 3. This compares very favorably with theoretical values of 1.6 and 1.9 for the half-sine pulse and unit step, respectively.

The block diagram of FIGURE 8 corresponds generally to the system of FIGURE 1 except that the filter set is shown in greater detail and certain ancillary portions of the system have been omitted for clarity. As can be seen, the filter drive impulse is applied to filter 22 via line 2. The output of filter 22 is applied to the input of filter 24 via line 30. Subsequent filters 27–29 are similarly connected in series, with the output of filter 29 going to the master gain control 21. The actual number of filters employed is dictated by the complexity of the transient envelope to be synthesized. Each individual filter (22, 24, and 27–29) is provided with controls for adjusting gain, "Q," center frequency, and function. For example, filter 22 is provided with gain control 15 which sets the amplitude of the peak height or notch depth independently of the "Q" value. Control 16 provides continuous adjustment of the "Q" value, and typically may have a range of 0 to 1,000. The peak or notch center frequency is selected by means of control 17 (typically through a range of 30 to 5,000 Hz.). Function switch 18 determines whether the filter is to function as a peak filter or a notch filter.

The length and height of the driving pulse control the energy input to the filter and thus determine the overall output amplitude; however, the driving pulse must be short in order to contain the higher spectral components. Thus, the pulse width must be sufficiently short to have a Fourier spectrum which is substantially flat over the range of frequencies of interest. As mentioned hereinabove, a pulse width of 100 microseconds has been found to be suitable in actual practice and has an associated Fourier transform which is virtually flat from 0 to 2,000 Hz.

To synthesize shock transients having specified shock spectra characteristics, the following method of the invention is employed:

The center frequencies of the filters (22, 24, and 27–29) are set at suitably spaced intervals and the gain controls (e.g., 15) are set to zero. The "Q's" of the filters are set to the desired values, as determined by the center frequency spacing and the general nature of the transient that is to be produced. A short duration voltage pulse from generator 1 is applied to the first filter 22 and the shock spectrum of the transient, sensed by the accelerometer 10, is measured at the center frequency of the filter. The spectrum level is, of course, controlled by changing the gain 15 of the filter. The second filter 24 is next introduced into the series by increasing its gain until the desired spectrum level at the next higher frequency is reached. The procedure is repeated with additional filters (e.g., 27–29) until the desired spectrum over the frequency range of interest has been produced.

The particular transient synthesis described hereinabove is exemplary and is by no means confined to the spectra patterns that have been described. In fact, if an adequate supply of shaping filters is available, there is virtually no limit to synthesis capabilities. It might be desired, under certain circumstances, for instance, to simulate transients that involve prolonged ringing at certain frequencies, so as to simulate the behavior of a lightly damped structure vibrating in its normal mode. These transients can be readily simulated by employing narrow bandwidth peak-notch or second order filters as waveshaping elements. Also, it is to be understood that the method is equally well suited to the simulation of the absolute Fourier spectra as well as a specified shock spectra. Actually, in some cases, it may be more desirable to design the transients to yield a specified Fourier spectrum, as this spectrum provides a considerably better description of the structural response than damped shock spectra.

In summary, the novel and improved dynamic test method described hereinabove is highly practical and entirely compatible with commercially available shake table systems. Since certain changes may be made in the above method and apparatus without departing from the scope of the invention herein involved, it is intended that all matter contained in the above description or shown in the acompanying drawings shall be interpreted as illustrative and not in a limiting sense. For example, the method of the invention can be extended to simulate desired three-dimensional spectral envelopes.

What is claimed is:

1. The method of producing an electrical oscillatory transient having a given spectrum envelope, comprising the steps of:
   generating a pulse which is sufficiently short to have a Fourier spectrum which is substantially flat over a given range of frequencies;
   applying said pulse to a plurality of series-connected peak-notch filters; and
   weighting the output of each of said filters to provide a combined output from all of said filters which corresponds to said given spectrum envelope.

2. The method of shock testing a structure comprising the steps of:
   mounting said structure on an electrodynamic shaker means;
   generating a driving pulse;
   applying said pulse to a plurality of series-connected peak-notch filters;
   weighting the output of each of said filters to provide a complex waveform at the output of the last of said series-connected filters which corresponds to said given spectrum envelope; and
   driving said shaker means with said complex waveform having said spectrum envelope.

3. Apparatus for producing an electrical transient waveform having a given response spectrum comprising:
   a pulse generator;
   a plurality of peak-notch filters each having an input and an output, said filters being adapted to be driven by a pulse from said pulse generator;
   means for selectively modifying the transfer function of each of said filters; and
   means for combining the modified outputs of said filters to provide a waveform having said given response spectrum.

4. Apparatus as defined in claim 3 wherein said pulse generator comprises:
   a square wave generator capable of producing a unidirectional voltage pulse sufficiently short to have an associated Fourier transform which is substantially flat from zero to above 2000 hertz.

5. Apparatus as defined in claim 3 wherein said modifying means comprises:
   a plurality of gain controls each adapted to selectively modify the output amplitude of a corresponding one of said filters;
   a plurality of Q controls each adapted to selectively change the ratio of the inductive reactance to the internal resistance of corresponding ones of said filters; and
   a plurality of frequency controls each adapted to selectively control the nominal center frequency of corresponding one of said filters.

6. Apparatus as defined in claim 3 wherein said combining means comprises:
   a signal transmission channel serially connecting said filters.

7. Apparatus for applying a motion transient, having desired spectra, to a test structure, comprising:
   an electrodynamic shaker having an electrical input and a mechanical output drivingly coupled to said test structure;
   sensor means coupled to said test structure so as to be responsive to a motion transient applied thereto;
   a spectrum analyzer responsive to said sensor means for indicating motion transients sensed by said sensor means;
   a pulse generator;
   a plurality of filters, the transmission characteristics of which are controllable with respect to the passed signal amplitude as a function of frequency, energized by said pulse generator;
   means for selectively modifying the transfer function of each of said filters to permit the synthesis of said response spectra;
   a signal transmission channel for combining the modified outputs of said filters;
   an amplifier having its input connected to said transmission channel; and
   means connecting the output of said amplifier to the input of said shaker whereby the waveform of the electrical input applied to said shaker substantially conforms to the spectra of said motion transients.

References Cited

UNITED STATES PATENTS 3,100,393   8/1963   Bell _____ 73—71.6
3,345,864   10/1967   Painter et al. _____ 73—71.6

RICHARD C. QUEISSER, *Primary Examiner.*

JOHN R. FLANAGAN, *Assistant Examiner.*